(12) United States Patent
Schrooten et al.

(10) Patent No.: US 9,178,244 B2
(45) Date of Patent: Nov. 3, 2015

(54) FUEL CELLS AND FUEL CELL COMPONENTS HAVING ASYMMETRIC ARCHITECTURE AND METHODS THEREOF

(75) Inventors: Jeremy Schrooten, Mission (CA); Paul Sobejko, North Vancouver (CA); Gerard F. McLean, West Vancouver (CA)

(73) Assignee: intelligent Energy Limited, San Jose, CA (US)

( * ) Notice: Subject to any disclaimer, the term of this patent is extended or adjusted under 35 U.S.C. 154(b) by 601 days.

(21) Appl. No.: 13/519,716

(22) PCT Filed: Dec. 23, 2010

(86) PCT No.: PCT/CA2010/002025
§ 371 (c)(1),
(2), (4) Date: Jun. 28, 2012

(87) PCT Pub. No.: WO2011/079377
PCT Pub. Date: Jul. 7, 2011

(65) Prior Publication Data
US 2012/0288781 A1    Nov. 15, 2012

Related U.S. Application Data

(60) Provisional application No. 61/290,448, filed on Dec. 28, 2009.

(51) Int. Cl.
*H01M 8/02* (2006.01)
*H01M 8/10* (2006.01)
(Continued)

(52) U.S. Cl.
CPC ............ *H01M 8/2465* (2013.01); *H01M 8/006* (2013.01); *H01M 8/0247* (2013.01);
(Continued)

(58) Field of Classification Search
USPC ......... 429/482, 535, 479, 452–471, 507–511, 429/517–522
See application file for complete search history.

(56) References Cited

U.S. PATENT DOCUMENTS 5,861,221 A    1/1999 Ledjeff et al.
5,925,477 A    7/1999 Ledjeff et al.
(Continued)

FOREIGN PATENT DOCUMENTS

CN    1659736       8/2005
CN    101849312 A   9/2010
(Continued)

OTHER PUBLICATIONS

"International Application Serial No. PCT/CA2010/002025, International Preliminary Report on Patentability mailed Jul. 12, 2012", 6 pgs.
(Continued)

*Primary Examiner* — Basia Ridley
*Assistant Examiner* — Caitlin Wilmot
(74) *Attorney, Agent, or Firm* — Baker Hostetler LLP; Mark H. Krietzman

(57) ABSTRACT

Embodiments relate to a composite for a fuel cell layer including a plurality of electron conducting components, a plurality of ion conducting components each having a first surface and a second surface and wherein each ion conducting component is positioned between two electron conducting components. The electron conducting components and the ion conducting components form a layer and at least one of the ion conducting components or the electron conducting components is geometrically asymmetric in one or more dimensions.

45 Claims, 10 Drawing Sheets

(51) Int. Cl.
*H01M 8/24* (2006.01)
*H01M 8/00* (2006.01)
(52) U.S. Cl.
CPC .... *H01M8/1065* (2013.01); *H01M 2008/1095* (2013.01); *H01M 2250/30* (2013.01); *Y02B 90/18* (2013.01); *Y02E 60/521* (2013.01)

(56) References Cited

U.S. PATENT DOCUMENTS

| | | | |
|---|---|---|---|
| 5,989,741 | A | 11/1999 | Bloomfield et al. |
| 6,136,412 | A | 10/2000 | Spiewak et al. |
| 6,582,845 | B2 | 6/2003 | Helfinstine et al. |
| 6,835,488 | B2 | 12/2004 | Sasahara et al. |
| 7,045,237 | B2 | 5/2006 | Sridhar et al. |
| 7,115,337 | B2 | 10/2006 | Kimura et al. |
| 7,314,677 | B2 | 1/2008 | Mosdale |
| 7,473,482 | B2 | 1/2009 | Hart et al. |
| 7,632,587 | B2 | 12/2009 | McLean et al. |
| 7,811,692 | B2 | 10/2010 | Apte et al. |
| 7,875,405 | B2 | 1/2011 | Imura et al. |
| 2002/0155335 | A1 | 10/2002 | Kearl et al. |
| 2003/0082425 | A1 | 5/2003 | Leban |
| 2003/0235737 | A1 | 12/2003 | Jeon et al. |
| 2004/0071865 | A1* | 4/2004 | Mosdale et al. ............ 427/115 |
| 2006/0057448 | A1 | 3/2006 | Miyauchi et al. |
| 2007/0026291 | A1 | 2/2007 | Kim et al. |
| 2008/0299435 | A1 | 12/2008 | Imura et al. |
| 2009/0095409 | A1 | 4/2009 | Schrooten et al. |
| 2009/0162722 | A1 | 6/2009 | Schrooten et al. |

FOREIGN PATENT DOCUMENTS

| | | | |
|---|---|---|---|
| CN | 102792503 | A | 11/2012 |
| EP | 1515387 | A1 | 3/2005 |
| JP | 10513600 | A | 12/1998 |
| JP | 2002367662 | A | 12/2002 |
| JP | 2006-520998 | A | 9/2006 |
| JP | 2006520998 | A | 9/2006 |
| JP | 2007536713 | A | 12/2007 |
| JP | 2008293757 | A | 12/2008 |
| JP | 2009117350 | A | 5/2009 |
| WO | WO-2009007555 | A1 | 1/2009 |
| WO | WO-2009025613 | A1 | 2/2009 |
| WO | WO-2009039654 | A1 | 4/2009 |
| WO | WO-2009105896 | A1 | 9/2009 |
| WO | WO-2011/079377 | A1 | 7/2011 |

OTHER PUBLICATIONS

"Korean Application Serial No. 10-2012-7019856, Amendment filed Jul. 19, 2013", with English translation, 31 pgs.
"Singapore Application Serial No. 201204781-7, Search Report mailed Sep. 13, 2013", 7 pgs.
"Singapore Application Serial No. 201204781-7, Written Opinion mailed Sep. 13, 2013", 11 pgs.
"Chinese Application Serial No. 201080064904.0, Office Action mailed Jul. 15, 2014", w/English translation, 24 pgs.
"International Application Serial No. PCT/CA2010/002025, Search Report mailed Feb. 28, 2011", 8.
"International Application Serial No. PCT/CA2010/002025, Written Opinion mailed Feb. 28, 2011", 8.
"European Application Serial No. 10840246.2, Extended European Search Report mailed Jun. 20, 2014", 8 pgs.
"Japanese Application Serial No. 2012-546294, Amendment filed Sep. 12, 2012", w/English claims, 11 pgs.
"Singaporean Application Serial No. 201204781-7, Amendment filed Feb. 7, 2013", 14 pgs.
Chinese Application Serial No. 201080064904.0 Response filed Nov. 28, 2014 to Office Action mailed Jul. 29, 2014, With the Chinese amended claims, 12 pgs.
European Application Serial No. 10840246.2 Response filed Nov. 17, 2014 to Extended European Search Report mailed Jun. 20, 2014, With the amended claims, 19 pgs.
Japanese Application Serial No. 2012-546294, Preliminary Rejection Report mailed Dec. 24, 2014, 6 pgs.
Mexican Application Serial No. MX/a/2012/007567, Office Action mailed Sep. 25, 2014, English translation, 1 pg.
"Japanese Application Serial No. 2012-546294, Amendments and Remarks filed Mar. 18, 2015 in response to Preliminary Rejection Report mailed Dec. 24, 2014", (w/ English Translation of Claims), 28 pgs.

* cited by examiner

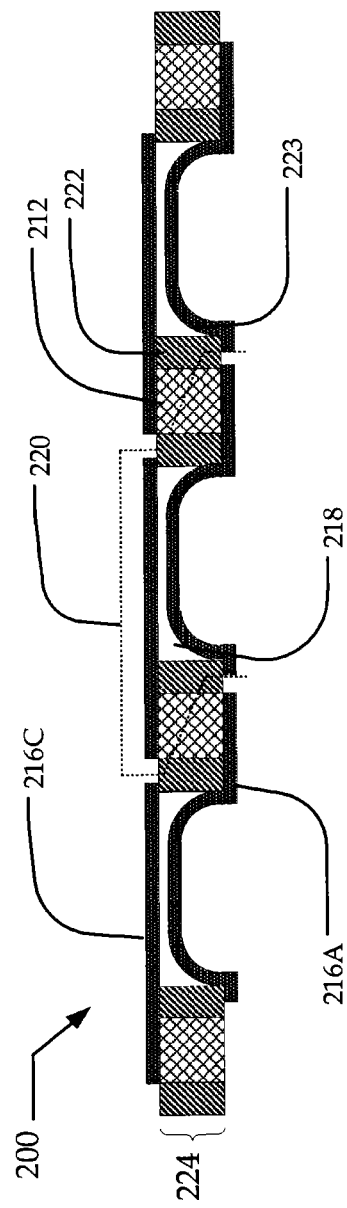
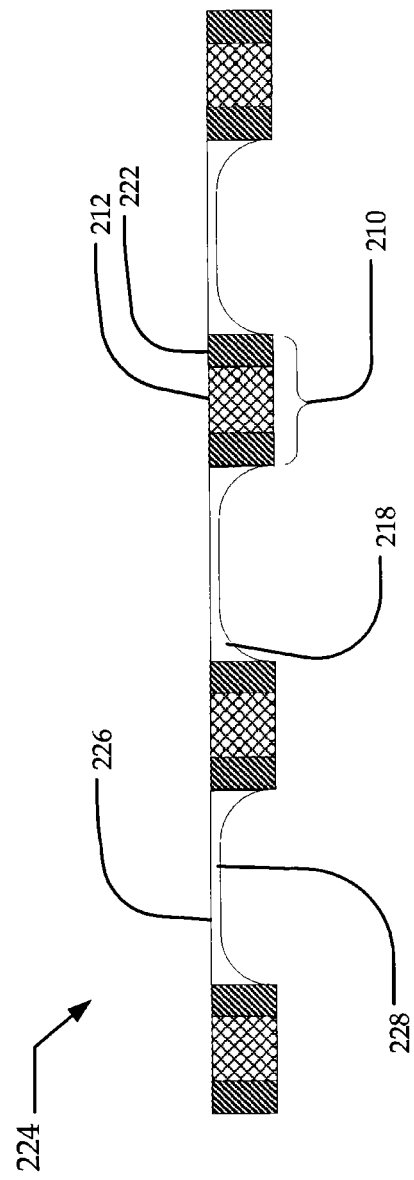
FIG. 2A
FIG. 2B

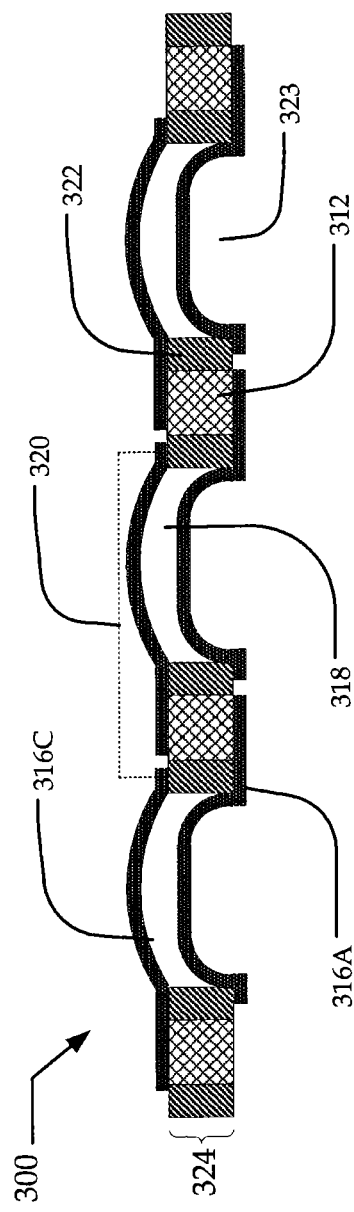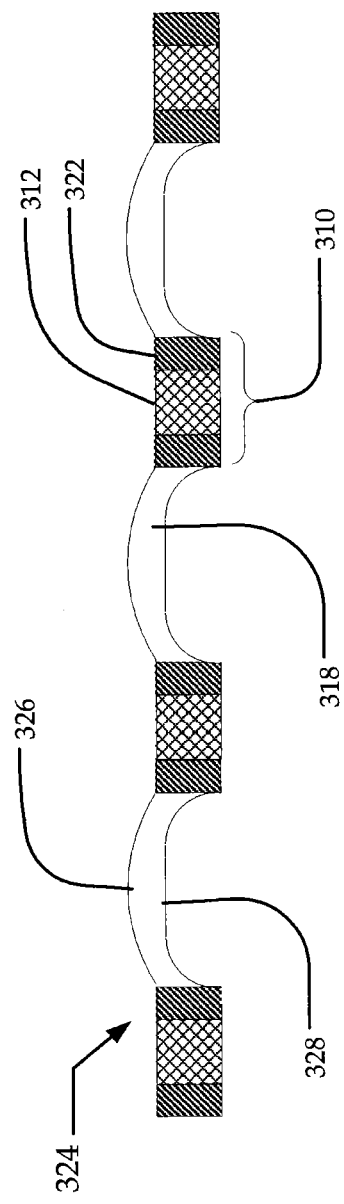

FUEL CELLS AND FUEL CELL COMPONENTS HAVING ASYMMETRIC ARCHITECTURE AND METHODS THEREOF

RELATED APPLICATIONS

This application is a U.S. National Stage Filing under 35 U.S.C. 371 from International Patent Application Serial No. PCT/CA2010/002025, filed Dec. 23, 2010, and published on Jul. 7, 2011 as WO 2011/079377 A1, which claims the priority benefit of U.S. Provisional Application Ser. No. 61/290,448, filed Dec. 28, 2009, the contents of which are incorporated herein by reference in their entirety.

BACKGROUND

Fuel cells may be employed as a power supply for an increasing number of large-scale applications, such as materials handling (e.g. forklifts), transportation (e.g. electric and hybrid vehicles) and off-grid power supply (e.g. for emergency power supply or telecommunications). Smaller fuel cells are now being developed for portable consumer applications, such as notebook computers, cellular telephones, personal digital assistants (PDAs), and the like.

In a typical conventional fuel cell (e.g. a fuel cell stack), fuel travels to the anode of a membrane electrode assembly (MEA) via bipolar plates having flow channels. Aside from fuel distribution, bipolar plates also function to separate unit fuel cells. The use of bipolar plates may increase the space occupied by the fuel cell stack and system. In order to ensure that there is electrical contact between bipolar plates and MEAs and to prevent fuel and oxidant from leaking out, conventional fuel cell stacks must be held together with compressive force. Various components may be used to hold conventional fuel cell stacks together. Conventional fuel cell stacks may therefore require many parts and assembly may be quite complex.

Fuel cells may also be connected in edge-collected configurations, such as planar configurations. In some edge-collected fuel cell designs, current is collected from the edges of individual unit cells and travels in the plane of the fuel cells.

Some edge-collected or planar fuel cell systems do not employ compressive force in order to maintain good contact between the fuel cell layer and various other components of the fuel cell system. In such fuel cell systems, components may be assembled and held in contact by other means.

Edge-collected fuel cells may be used to power portable consumer applications, such as notebook computers, cellular telephones, personal digital assistants (PDAs), and the like. Such applications often have little space available for a fuel cell system.

SUMMARY

Embodiments relate to a composite for a fuel cell layer including a plurality of electron conducting components, a plurality of ion conducting components each having a first surface and a second surface and wherein each ion conducting component is positioned between two electron conducting components. The electron conducting components and the ion conducting components form a layer and at least one of the ion conducting components or the electron conducting components is geometrically asymmetric in one or more dimensions.

Embodiments also relate to a fuel cell including a composite layer including a geometrically asymmetric ion conducting component having a first surface and a second surface and two or more electron conducting components having a first surface and a second surface. The ion conducting component is positioned between the electron conducting components and two electrode coatings that are each in ionic contact with the ion conducting component and in electrical contact with one of the electron conducting components.

BRIEF DESCRIPTION OF THE DRAWINGS

The accompanying drawings illustrate non-limiting example embodiments of the invention. In the drawings, like numerals describe components that are similar, but not necessarily the same. Like numerals having different letter suffixes represent different instances of components that are similar but not necessarily the same.

FIGS. 2A and 2B are cross-sectional views of, respectively, an asymmetric planar fuel cell and an asymmetric composite, according to a first example embodiment.

FIGS. 4A, 4B and 4C are cross-sectional views of, respectively, an asymmetric planar fuel cell and an asymmetric composite, according to a third example embodiment.

DETAILED DESCRIPTION

Figure 1A:
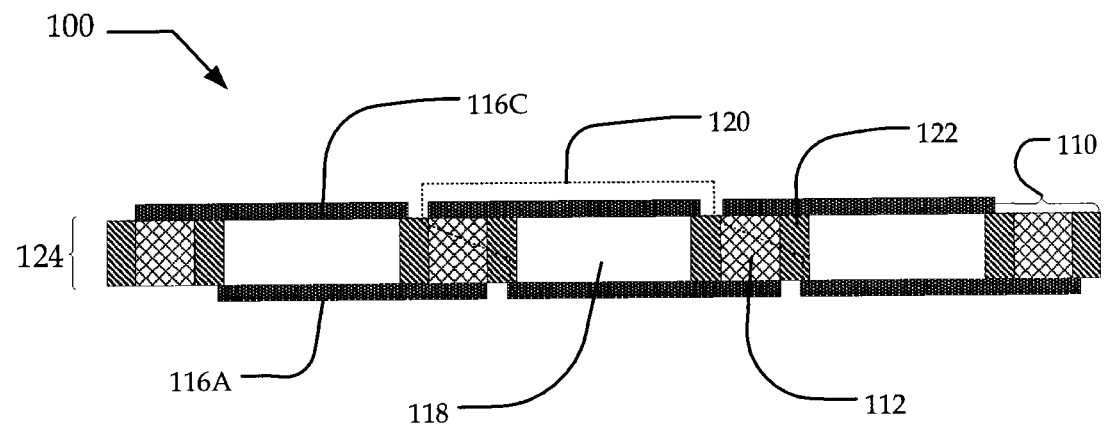
FIGS. 1A and 1B are cross-sectional views of, respectively, a first example planar fuel cell layer and a second example planar fuel cell layer.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated.

In this document, the terms "above" and "below" are used to describe two different directions in relation to the center of a composite and the terms "upper" and "lower" are used to describe two different surfaces of a composite. The cathode layer or coating is described as being "above" the composite, while the anode layer or coating is described as being "below" the composite. However, these terms are used merely for ease of description and are not to be understood as fixing the orientation of a fuel cell layer of the described embodiments.

In the appended aspects and in any claims, the terms "first", "second" and "third", etc. are used merely as labels, and are not intended to impose numerical requirements on their objects.

Planar fuel cell systems may be employed to power small portable applications. Since such applications often have little space available for a fuel cell system, it may be advantageous for fuel cell systems to have reduced space requirements. The space occupied by a fuel cell system may be reduced by employing in the fuel cell layer, composite layers with asymmetric architecture.

In some planar fuel cell systems, a plenum is employed for transporting fuel to the anodes of the fuel cell layer. Such plenums may or may not have flow channels. Asymmetric fuel cell layers of some embodiments may include full or partial flow channels in the fuel cell layer, thereby reducing the space occupied by the fuel cell system.

In some planar fuel cell systems, rather than being compressed, the components may be bonded together to create and maintain sufficient contact between components. For example, components may be bonded together using an internal support structure, such as those found in commonly-owned U.S. Patent Application Publication No. 2009/0081493, entitled "FUEL CELL SYSTEMS INCLUDING SPACE-SAVING FLUID PLENUM AND RELATED METHODS", and commonly-owned PCT Publication No. WO/2009/105896, entitled "ELECTROCHEMICAL CELL AND MEMBRANES RELATED THERETO", the disclosures of which are herein incorporated by reference in their entirety. In some planar fuel cells systems that are operated with a positive gas reactant pressure, these bonds counteract the load applied to the fuel cell by the internal gas pressure. Asymmetric fuel cell layers according to some embodiments may be easily bonded together and easily bonded to a fuel plenum, for example.

Provided are composite layers for fuel cells, the composite layers having asymmetric architecture. The composites include ion conducting components and electron conducting components. A composite may be asymmetric due to asymmetry in the ion conducting components, asymmetry in the electron conducting components, or both. Provided are asymmetric fuel cell layers including asymmetric composites. The employment of an asymmetric fuel cell layer in fuel cell system may allow for simpler assembly of the fuel cell system, may reduce the space occupied by the fuel cell system, or both.

Embodiments of the invention are described as proton exchange membrane (PEM) fuel cells or components of PEM fuel cells. However, embodiments may be practiced with other types of fuel cells, such as alkaline fuel cells or solid oxide fuel cells. Embodiments may also have application in other types of electrochemical cells, such as electrolyzers or chlor-alkali cells.

Fuel cell systems according to some embodiments may be used as a source of power for various applications. For example, fuel cell systems may be used to power portable consumer devices, such as notebook computers, cellular telephones or PDAs. However, the invention is not restricted to use with portable consumer devices and embodiments may be practiced to power larger applications, such as materials handling applications, transportation applications or off-grid power generation; or other smaller applications.

Embodiments of the invention may be practiced with fuel cells of a variety of different designs. Described herein is the practice of embodiments with some edge-collected fuel cells, which are generally composed of planar layers. However, the same or other embodiments may alternatively be practiced with other edge-collected fuel cells, which may or may not be present. For ease of reference, throughout the description, such edge-collected fuel cells and related technology are referred to as "planar" fuel cells, "planar" fuel cell systems or "planar" fuel cell layers. However, it is to be understood that in some embodiments such fuel cells may not be planar to be practiced with the invention. For example, unit fuel cells may not all lie in the same plane (e.g. they may be flexible, spiral, tubular, or undulating). In another example, unit fuel cells may all or partially lie in the same plane.

Definitions

As used herein, "catalyst" refers to a material or substance that assists in starting or increasing the rate of a reaction, without being modified or consumed itself. Catalyst layers may comprise any type of electrocatalyst suitable for the application at hand. Catalysts or catalyst layers may include pure platinum, carbon-supported platinum, platinum black, platinum-ruthenium, palladium, copper, tin oxide, nickel, gold, mixtures of carbon black and one or more binders. Binders may include ionomers, polypropylene, polyethylene, polycarbonate, polyimides, polyamides, fluoropolymers and other polymer materials, and may be films, powders, or dispersions. An example of a polyimide includes Kapton®. An example of a fluoropolymer is PTFE (polytetrafluoroethylene) or Teflon®. Other fluoropolymers include PFSA (perfluorosulfonic acid), FEP (fluorinated ethylene propylene), PEEK (poly ethylene ether ketones) and PFA (perfluoroalkoxyethylene). The binder may also include PVDF (polyvinylidene difluoride) powder (e.g., Kynar®) and silicon dioxide powder. The binder may include any combination of polymers or ionomers. The carbon black may include any suitable finely divided carbon material such as one or more of acetylene black carbon, carbon particles, carbon flakes, carbon fibers, carbon needles, carbon nanotubes, and carbon nanoparticles.

As used herein, "coating" refers to a conductive thin-layer disposed on the surface of a composite layer. For example, the coating may be a catalyst layer or electrodes, such as anodes and cathodes.

As used herein, a "composite layer" or a "composite" refers to a layer including at least two surfaces having a thickness, where one or more ion conducting passages and one or more electrically conductive passages are defined between the surfaces. Ion conducting properties and electrically conductive properties of a composite may be varied in different regions of the composite layer by defining ion conducting passages and electrically conductive passages with varying sizes, shapes, densities or arrangements. A composite layer may also include one or more interface regions. A composite layer may be impermeable to a fluid, or to a particular type of fluid (e.g. a gas or a liquid). In some embodiments, the layer may be substantially impermeable to some fluids, but permeable to others. For example, the layer may be substantially impermeable to a gas pressure imparted by a fuel; however, water may be able to migrate across the ion conducting component As used herein, an "electron conducting component" refers to a component of a composite layer that provides an electrically conductive passage. Electron conducting components include one or more materials that are electrically conductive, for example, metals, metal foams, carbonaceous materials, electrically conductive ceramics, electrically conductive polymers, combinations thereof, and the like. Electron conducting components may also include materials that are not electrically conductive. Electron conducting components may also be referred to herein as "current conducting components" or "current collectors".

As used herein, "fuel" refers to any material suitable for use as a fuel in a fuel cell. Examples of fuel may include, but are not limited to hydrogen, methanol, ethanol, butane, borohydride compounds such as sodium or potassium borohydride, formic acid, ammonia and ammonia derivatives such as amines and hydrazine, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane As used herein, an "ion conducting component" refers to a component that provides an ion conducting passage. Ion conducting components may be components of a composite. Ion conducting components include an ion conducting material, such as a fluoropolymer-based ion conducting material or a hydrocarbon-based conducting material. Ion conducting components may also be referred to herein as "electrolytes", or "electrolyte membranes".

As used herein, an "interface region" refers to a component of a composite layer that is not electrically conductive. An interface region may include a material which exhibits negligible ionic conductivity and negligible electrical conductivity, for example. Interface regions may be used in conjunction with electron conducting regions to form current collectors, and in such cases may be disposed adjacent electron conducting regions on one or both sides of the electron conducting region. Electron conducting regions may be embedded in an interface region to form a current collector. It is to be understood that an interface region (or interface regions) is an optional component in a current collector, not a necessary component. When used as a component of a current collector, an interface region may be used to promote adhesion between electron conducting regions and ion conducting components, and/or may be used to provide electrical insulation between adjacent electrochemical cells.

As used herein, "plane" refers to a two-dimensional hypothetical surface having a determinate extension and spatial direction or position. For example, a rectangular block may have a vertical plane and two horizontal planes, orthogonal to one another. Planes may be defined relative to one another using angles greater or less than 90 degrees, for example.

Figure 1B:
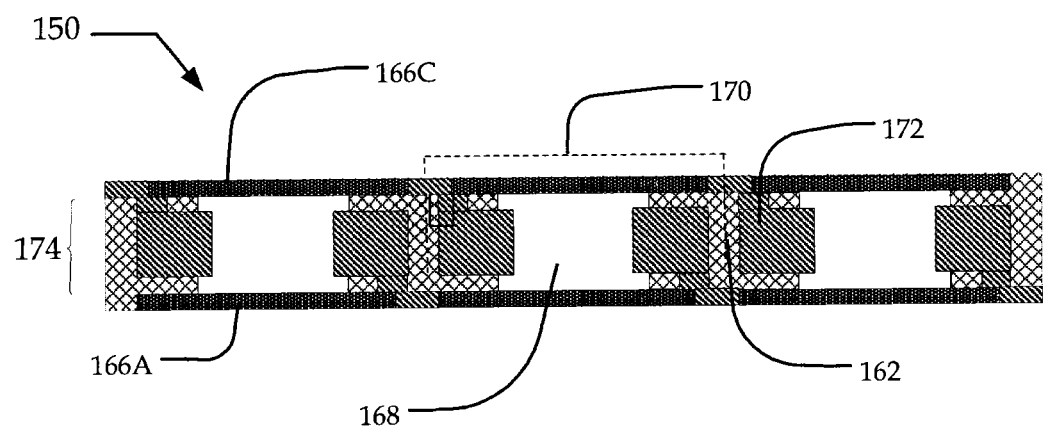

FIGS. 1A and 1B show cross-sectional views of a first example planar fuel cell layer 100 and a second example planar fuel cell 150, as described in co-assigned U.S. patent application Ser. No. 11/047,560 and Patent Cooperation Treaty application No. CA2009/000253, respectively entitled ELECTROCHEMICAL CELLS HAVING CURRENT-CARRYING STRUCTURES UNDERLYING ELECTROCHEMICAL REACTION LAYERS and ELECTROCHEMICAL CELL AND MEMBRANES RELATED THERETO. While embodiments of the invention are described as applied to these example planar fuel cell layers, embodiments may be applied to other edge-collected or planar fuel cell layers. Examples of other planar fuel cell layers are provided in U.S. Pat. Nos. 5,989,741 and 5,861,221 respectively entitled ELECTROCHEMICAL CELL SYSTEM WITH SIDE-BY-SIDE ARRANGEMENT OF CELLS and BATTERY SHAPED AS A MEMBRANE STRIP CONTAINING SEVERAL CELLS, and U.S. patent application Ser. No. 12/153,764 entitled FUEL CELL.

Example planar fuel cell layers 100, 150 include a composite layer 124, 174 having ion conducting components 118, 168 and electron conducting components 112, 162. Optionally, composite layer 124, 174 may also have interface or substrate regions 122, 172. Interface or substrate regions 122, 172 may include a material that is non-conductive. Electron conducting components 112 and optional interface or substrate regions 122 may form current collectors 110. Fuel cell layers 100, 150 have two types of electrode coatings, namely cathode coatings 116C, 166C and anode coatings 116A, 166A. Cathode coatings 116C, 166C are disposed on the upper side of composite 124, 174 and are adhered to the upper surface of composite 124, 174. Anode coatings 116A, 176A are disposed on the lower side of composite 124, 174 and are adhered to the lower surface of composite 124, 174.

Figure 3A:
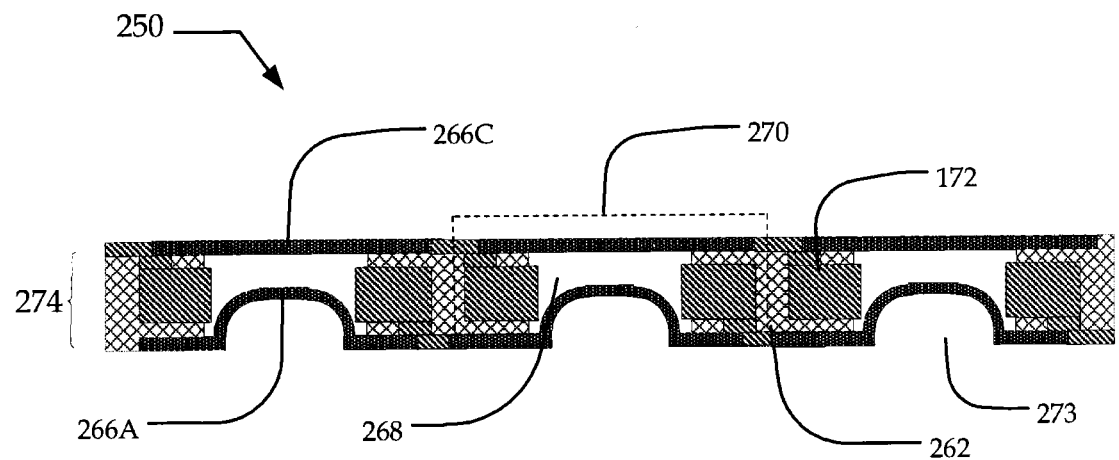
FIGS. 3A and 3B are cross-sectional views of, respectively, an asymmetric planar fuel cell and an asymmetric composite, according to a second example embodiment.
Figure 3B:
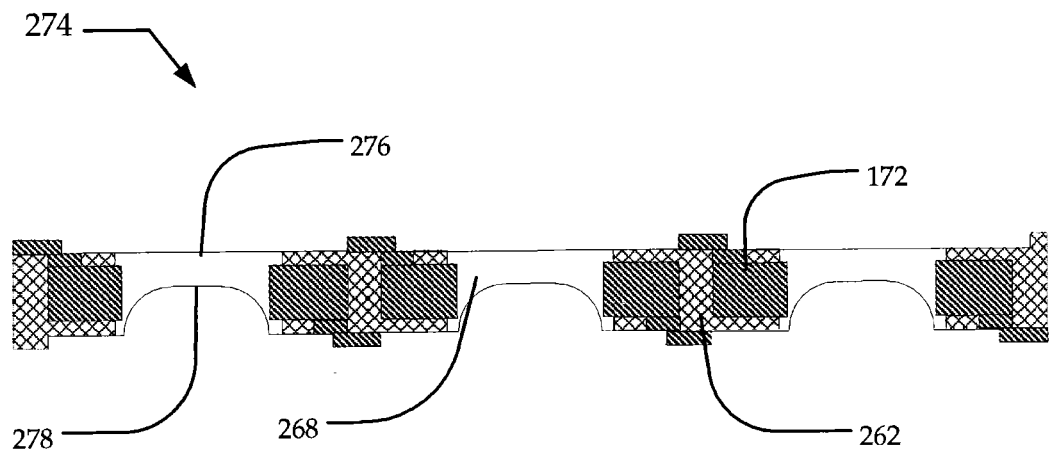

FIGS. 2A and 3A are cross-sectional views of two planar fuel cells having a geometrically asymmetric architecture in one or more dimensions, according to two example embodiments. Planar fuel cells 200, 250 include a composite layer 224, 274 having ion conducting components 218, 268 and electron conducting components 212, 262. Optionally, composite 224, 274 may also have interface or substrate regions 222, 272. Interface or substrate regions 222, 272 may include a material that is electrically and/or ionically non-conductive. Electron conducting components 218 and optional interface or substrate regions 222 may form current collectors 210. In the embodiments shown, ion conducting components 218, 268 are each asymmetric. In the embodiment shown, composites 224, 274 are also asymmetric. Composites 224, 274 are shown in FIGS. 2B and 3B.

Asymmetric composites may have ion conducting components with one or more of three different types of asymmetry: asymmetry in surface shape or profile; asymmetry in surface area; and, asymmetry in position with respect to the center of the composite. In the embodiments shown, each of ion conducting components 218, 268 have all three types of asymmetry. However, it is to be understood that a composite may have ion conducting components that have less than three types of asymmetry or more than three types of asymmetry.

In the embodiments shown, ion conducting components 218, 268 have asymmetry in surface shape or profile—each have an upper surface 226, 276 that is substantially flat or level and a lower surface 228, 278 that is substantially concave or trough-shaped. However, other combinations of surface shapes or profiles are also possible. For example, ion conducting components may have a surface that is substantially concave. FIG. 4A shows a cross-sectional view of a planar fuel cell having asymmetric architecture, according to a third example embodiment. Fuel cell layer 300 has a composite 324 that has ion conducting components 318 that have an upper surface 326 that is substantially convex and a lower surface 328 that is substantially trough-shaped, but may change shape during operation of the fuel cell or fuel cell layer.

In the embodiments shown in FIGS. 2 and 3, ion conducting components 218, 268 have asymmetry in surface area, since the trough-shaped lower surfaces 228, 278 have surface areas that are greater than the surface areas of the flat upper surfaces 226, 276. In the embodiments shown in FIGS. 2 and 3, the lower surfaces (e.g. the surfaces that are in contact with the anode coatings) have greater surface areas than the upper surfaces (e.g. the surfaces that are in contact with the cathode coatings). However, in other example embodiments, the upper surfaces have greater surface areas than the lower surfaces. In other embodiments, the upper and lower surfaces have the same surface area (and are therefore not asymmetric with respect to surface area).

In some examples, in the embodiments illustrated in FIGS. 2 and 3, the lower surfaces may be in contact with the anode coatings, while the upper surfaces may be in contact with the cathode coatings. In other examples, the lower surfaces may be in contact with the cathode coatings while the upper surfaces may be in contact with the anode coatings. In such embodiments, the concave portions of the ion conducting components illustrated in FIGS. 2 and 3 form the cathode portions of the fuel cell layer rather than the anode portions. Such a configuration may provide a fuel cell layer that deforms differently when a reactant is introduced into the anode, or fuel, plenum, pressurizing the layer, and consequently modifying the load applied to the membrane and coatings relative to how the layer would deform and stress in configurations wherein the concave portions of the ion conducting components form the anode portions of the fuel cell layer. In either configuration, the concave portions of the fuel cell layer may be filled with some form of filler material (not shown) to provide structural support for the ion conducting components and electrode coatings. Such a filler material may be non-conductive or conductive, and may be porous to allow transport of reactant to the electrode coatings. If the filler is electrically conductive, it may be disposed such that it does not inadvertently create an electrical connection between adjacent cells. Suitable porous conductive materials may include a carbon textile, carbon powder, corrosion resistant metal textile, corrosion resistant metal powder, graphite powder, or any other suitable material.

Figure 4C:
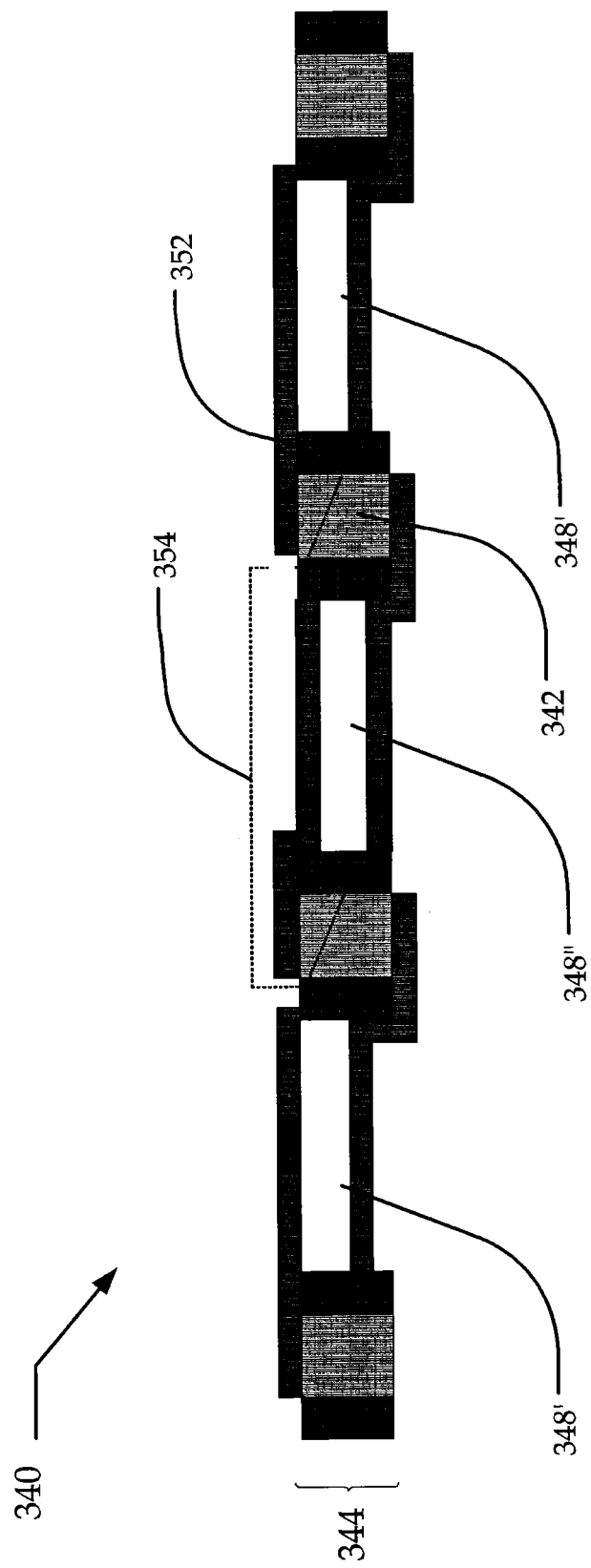

In the embodiment shown, ion conducting components 218, 268 have asymmetry in position with respect to the center of composite 224, 274 or fuel cell layer 200, 250. As can be seen, upper surfaces 226, 276 are approximately flush with the upper surface of electron conducting components 212, 262 while lower surfaces 228, 278 are recessed from the lower surface of electron conducting components 212, 262. In the embodiment shown in FIG. 4, upper surfaces 326 are raised with respect to the upper surface of electron conducting components 312 while lower surfaces 328 are recessed from the lower surface of electron conducting components 312. However, other combinations of positions of ion conducting component surfaces are also possible. In an alternative example embodiment, both surfaces are recessed from the surface of the electron conducting component. Such an embodiment may or may not be asymmetric, depending on whether the upper and lower surfaces are recessed to the same degree and whether they have the same surface shape and surface area. FIG. 4C shows a fuel cell layer having ion conducting components 348. In the embodiment shown, ion conducting components 348 are flush with the upper surface and indented from the lower surface of composite 344 and are therefore asymmetric with respect to position. Ion conducting component 348" is indented from both surfaces of composite 344, but positioned asymmetrically, or offset from the central axis of the fuel cell layer. Ion conducting components may be positioned in any number of locations relative to the upper and lower surfaces of the fuel cell layer to provide an asymmetric fuel cell layer.

In addition to the asymmetries described herein, composites and fuel cell layers may also possess other irregularities—e.g. composites and fuel cell layers, aside from the asymmetries discussed, need not be regular or symmetric. For example, fuel cell layers may include anode and cathode coatings having different catalyst loadings or different morphology, ion conducting components or electrode coatings having irregular macro- or micro-structures, or the like. Fuel cell layers may include support structures that may be symmetric or asymmetric in nature, in that they may be disposed on the anode side and/or the cathode side, may be disposed on only one side of the fuel cell layer, or may differ in structure from anode side to cathode side.

Fuel cell layers 200, 250, 300 have two types of electrode coatings, namely cathode coatings 216C, 266C, 316C and anode coatings 216A, 266A, 316A. Cathode coatings 216C, 266C, 316C are disposed on the upper side of composite 224, 274, 324 and are adhered to the upper surface of composite 224, 274, 324. Anode coatings 216A, 266A, 316A are disposed on the lower side of composite 224, 274, 324 and are adhered to the lower surface of composite 224, 274, 324. In the embodiments shown, together, lower surfaces 228, 278, 328 and anode coatings 216A, 266A, 316A define voids 223, 273, 323 into which a fluid may be introduced. The anode coatings and cathode coatings may be prepared using methods and materials that are generally known in the art. As noted above, coatings 216C, 266C, and 316C may alternately be anode coatings; in such embodiments, coatings 216A, 266A, and 316A form cathode coatings.

Fuel cell layers 200, 250, 300 have one or more unit fuel cells 220, 270, 320. In the embodiments shown, in a unit cell, a cathode coating is disposed on the upper surface of the associated ion conductive component and is substantially coextensive with the ion conductive component. An anode coating is disposed on the lower surface of the associated ion conductive component and is substantially coextensive with the ion conductive component. The cathode coating of a unit cell extends substantially over a first electron conducting component and the anode coating extends substantially over a second electron conducting component. Both the cathode coating and anode coating are in ionic contact with the ion conducting component and in electrical contact with one of the electron conducting components. In the embodiments shown, unit cells are connected in series. However, unit cells may alternatively be connected in parallel or in series-parallel combinations.

Figure 5A:
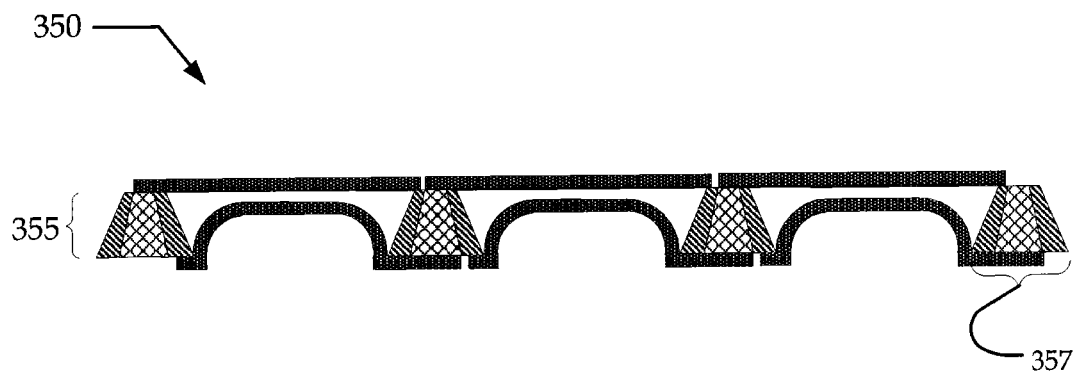
FIGS. 5A, 5B, 5C and 5D are cross-sectional views of asymmetric fuel cells, according to fourth, fifth, sixth and seventh example embodiments.
Figure 5B:
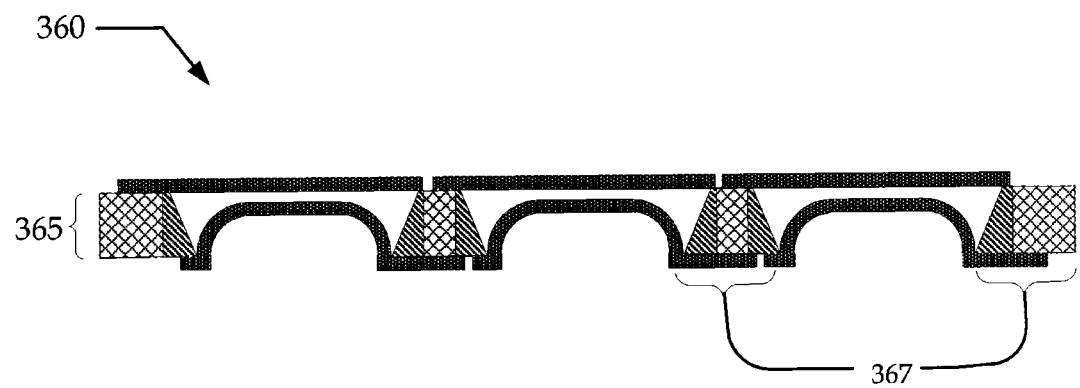
Figure 5C:
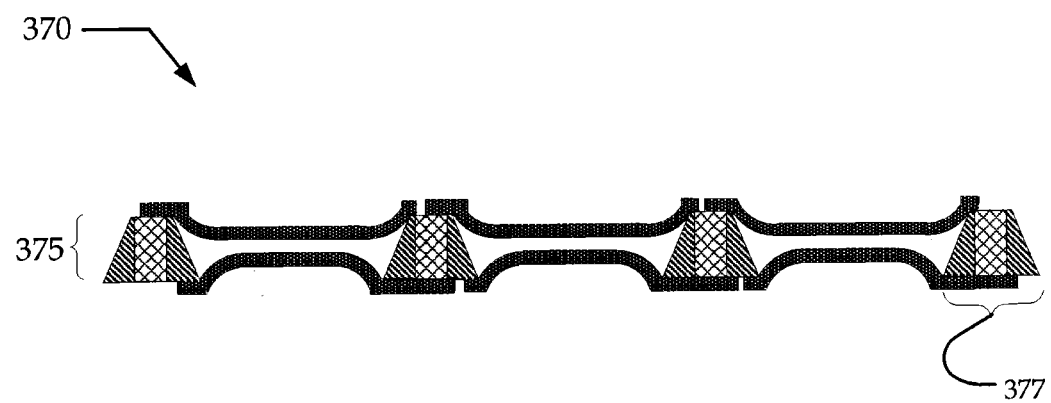

The first and third embodiments illustrated include asymmetric ion conducting components and symmetric current collectors (including symmetric electron conducting components). However, in other embodiments, current collectors or electron conducting components may be asymmetric. FIGS. 5A-5C show cross-sectional views of asymmetric fuel cell layers, according to fourth, fifth and sixth example embodiments. Fuel cell layers 350, 360, 370 have asymmetric current collectors 357, 367, 377. In current collectors 357, the electron conducting components and interface regions are asymmetric with respect to shape and surface area (e.g. the upper and lower surfaces of electron conducting components and interface regions have different surface areas). In current collectors 367, 377 electron conducting components are symmetric while interface regions that are asymmetric with respect to shape and surface area (e.g. the upper and lower surfaces of electron conducting components have the same surface area while the upper and lower surfaces of interface regions have different surface areas). Asymmetric current collectors of the illustrated embodiments may allow for easier assembly of a fuel cell system. In such embodiments, the wider base of the current collectors may allow for easier assembly of the fuel cell system by providing a larger area for the application of an adhesive.

Figure 5D:
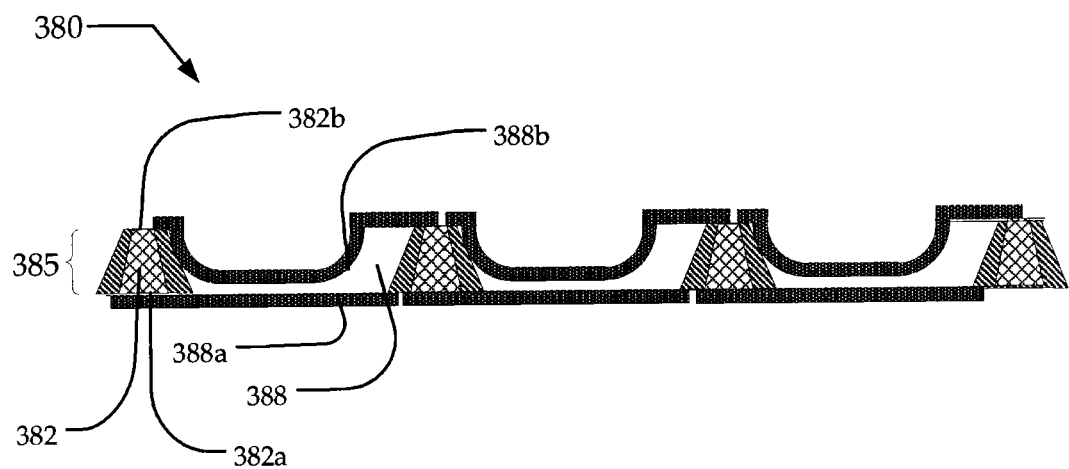

FIG. 5D illustrates a seventh embodiment. The embodiment includes asymmetric ion conducting components and asymmetric current collectors, wherein the current collectors may be arranged in an inverse geometry relative to the ion conducting components, compared to the embodiments shown in FIGS. 5A-5C. In FIG. 5D, the wider base 382a of the current collector 382 is illustrated on the bottom surface of the fuel cell layer 385, and is aligned with the flat surface 388a of the ion conducting components 388. The narrower edge 382b of the current collector 382 is on the same surface of the fuel cell layer 385 as the concave surface 388b of the ion conducting components 388. Such an orientation may provide advantages in embodiments wherein the ion conducting components 388 are disposed as a dispersion, wherein the current collecting components 382 are arranged on a flat surface of some sort for manufacturing purposes. A dispersion may be deposited between adjacent current collecting components 382 (e.g. from above the current collecting components) to form ion conducting components 388.

A person of skill in the art will appreciate that only selected embodiments of asymmetric current collectors are shown in the illustrated embodiments herein, and that many other alternative asymmetries are possible and contemplated by the inventors.

As can be seen, the electrode coatings of fuel cell layers 350, 360 are asymmetric with respect to both surface shape and position. The electrode coatings of fuel cell layers 350, 360 may also be asymmetric with respect to surface area. The architecture of fuel cell layers 350, 360 may offer advantages. The trough-shaped (or alternatively, concave-shaped) anode coatings allow for voids that may be used as full or partial fluid flow channels. Since in some example fuel cells, the cathode reaction has slower kinetics, employing cathode coatings with larger surface area may improve overall kinetic performance of the fuel cell system.

The electrode coatings of fuel cell layer 370 are asymmetric with respect to surface area. While both anode coatings and cathode coatings may be described as trough-shaped, the cathode coatings have a larger surface area. The architecture of fuel cell layer 370 may offer advantages. The trough-shaped (or alternatively, concave-shaped) anode coatings allow for voids that may be used as full or partial fluid flow channels. The larger surface area of the cathode coatings may improve overall kinetic performance of the fuel cell system. The recession of the cathode coatings (with respect to the upper surface of the electron conducting components) may allow for simpler manufacturing of fuel cell layers.

As mentioned above, fuel cell layers may further possess covers or support structures, which may be symmetric or asymmetric relative to the fuel cell layer, in that they may be disposed on both the anode side and the cathode side, on just the anode side, or just the cathode side of the layer. For example, in some embodiments, a support structure, such as a dimensionally stable porous material, may be bonded to the electron conducting components on the cathode side of the fuel cell layer. The support structure may be bonded to the electron conducting components using an adhesive, such as, for example, a urethane adhesive, although any suitable means of bonding may be used. The structure may be continuously bonded along the length of each electron conducting component, or may be tack bonded at regular intervals along an individual electron conducting component. In some embodiments, the support structure may be bonded to each electron conducting component, while in other embodiments, the support structure may be bonded to one or more electron conducting components. The support structure may be applied with a pre-stress tension to increase its resistance to out-of-plane deformation. As the ion conducting component(s) hydrates or gas pressure is applied to the anode plenum, the support structure may act as a tension member, preventing deformation of the ion conducting component(s). Bonded covers such as those described herein may be used alone or in combination with other robustness-enhancing components, in embodiments where such stabilization is desired. The material chosen for the support structure may be chosen to maximize beneficial properties of the addition of a transport layer above the cathode, while also being dimensionally stable and of sufficient tensile strength to resist or limit deformation of the electrolyte layer when, for example, gas pressure and hydration are applied. Examples of potentially useful support structure materials include, for example, meshes, woven or non-woven fabrics, expanded sheets or discrete threads composed of inert materials with appropriate properties for use within the fuel cell including, for example, various plastics, ceramics, paper and organic fibres. Further examples of potential materials may be found in commonly-owned patent application WO 2009/039654, titled "Covers for Electrochemcial Cells and Related Methods".

In other embodiments, a support structure, such as a dimensionally stable porous material, may be bonded to the fuel cells on the anode side of the fuel cell layer. As with a support structure bonded to the cathode side of the fuel cell layer, the support structure may be bonded to the current collectors or to the electrode coatings, or to a conductive agent disposed on top of the current collectors. The bond may be implemented by using an adhesive, such as, for example, a urethane adhesive, although any suitable means of bonding the porous material to the fuel cell layer may be employed. The support structure may be continuously bonded along the length of each current collector, or may be tack bonded at regular intervals along an individual current collector. In some embodiments, the support structure may be bonded to every current collector, and in other embodiments, the support structure may be bonded to one or more current collectors. In some embodiments, the support structure may be bonded to a fluidic or fuel distribution manifold in addition to being bonded to the fuel cell layer, using an adhesive or any other suitable bonding method. In some embodiments, as gas pressure is applied to the anode plenum, the support structure may act as a tension member, tying the fuel cell layer to the manifold. In such embodiments, the support structure may be selected to have additional benefits, such as improving or controlling hydrogen distribution within the plenum either passively or actively, for example by using materials such as those described in commonly owned patent application WO 2009/039654, titled "Covers for Electrochemical Cells and Related Methods". Other potentially useful support structure materials include, for example, meshes, woven or non-woven fabrics, expanded sheets or discrete threads composed of inert materials with appropriate properties for use within the fuel cell including, for example, various plastics, ceramics, paper and organic fibers.

In embodiments where support structures are employed, the fuel cell layer may be arranged such that the ion conducting components may have a concave surface on one or both sides of the layer. The concave surface may be used to form the anode side of the fuel cell layer or the cathode side of the fuel cell layer.

Figure 6:
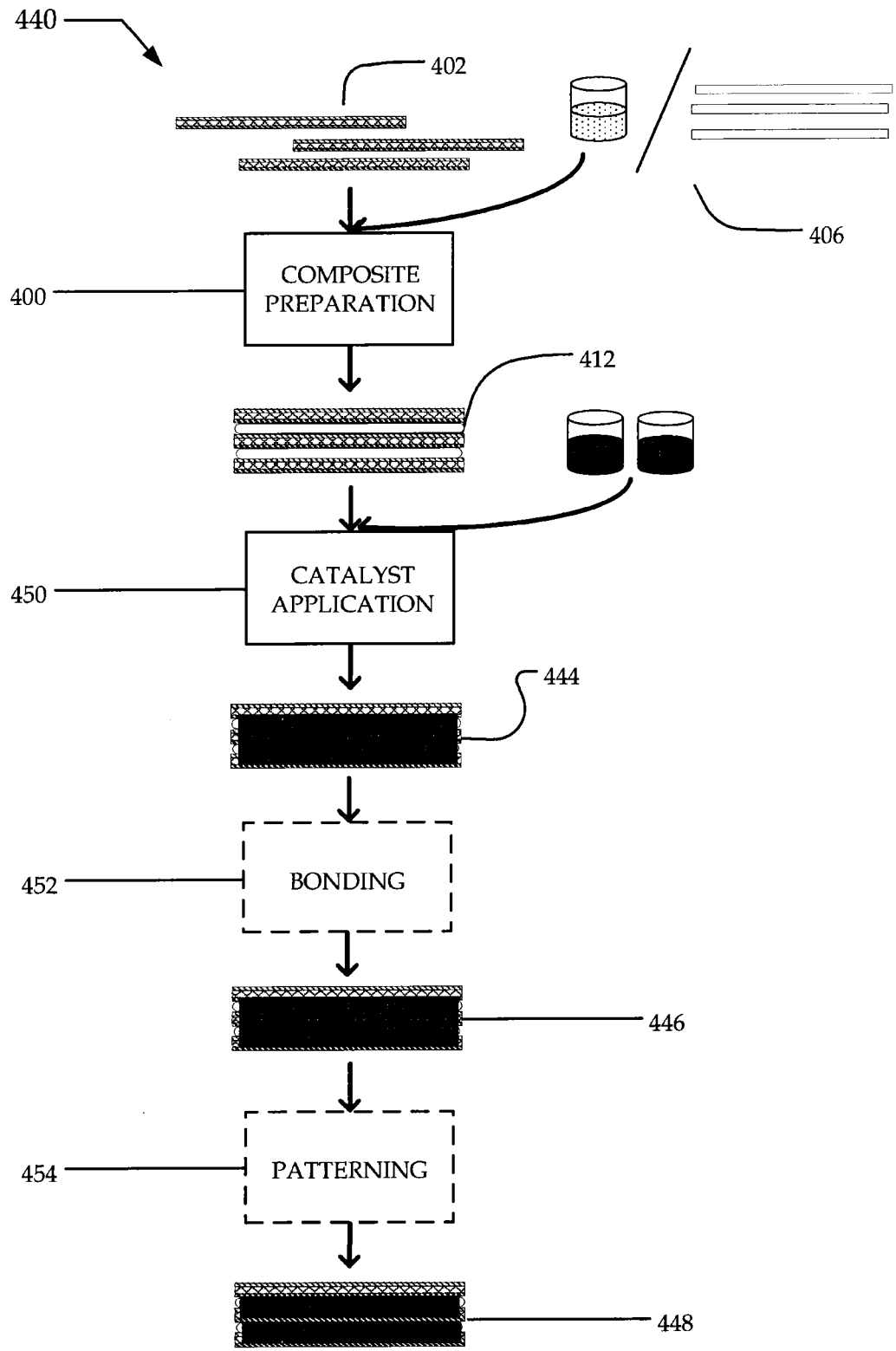
FIG. 6 is a block process diagram of one possible method of preparing an asymmetric planar fuel cell layer, according to an example embodiment.

FIG. 6 is a block process diagram of a method of preparing a fuel cell layer having asymmetric architecture, according to an example embodiment. In method 440, current collectors 402 are subjected to a composite preparation stage 400 to yield a composite 412. Composite 412 is subjected to a catalyst application stage 450 to yield a coated composite 444. Coated composite 444 may be subjected to a bonding stage 452 to yield a bonded composite 446. Bonded composite 446 may be subjected to an optional patterning stage 454 to yield a fuel cell layer 448 having asymmetric architecture.

Composite preparation stage 400 may include assembling current collectors 402 and electrolyte components. For example, current collectors 402 may be arranged in parallel strips, and ion-conducting components may be disposed between adjacent current collectors. Ion-conducting components be disposed by casting and curing an ionomer dispersion, for example, or may be disposed as discrete strips of proton exchange membrane material. The components may be further bonded together to create the composite layer.

Current collectors 402 include an electron conducting material and optionally, a non-conductive material. For example, current collectors may include electron conducting materials such as carbon (e.g. carbon fibers, carbon foams, etc.), metals, or metal alloys. Current collectors may include a non-conductive material, for example, an insulating material that is chemically inert. In an example embodiment, current collectors include two non-conductive materials; a filler and a non-conductive binder.

In the embodiment shown, current collectors 402 are strips of electrically conductive material surrounded by non-electrically conductive material, which may optionally also be non-ionically conductive. However, current collectors according to various other embodiments may be used. For example, current collectors may include electron conducting material and omit the discrete components of electrically non-conductive material, or may include electrically non-conductive material disposed on one side of the electrically conductive material only. In some example embodiments, current collectors may include electrically conductive pathways embedded in a non-electrically conductive framework, such as carbon fibers embedded in an epoxy framework, for example. In another example embodiment, current collectors include two or more different electron conducting materials. Current collectors may have profiles of a variety of shapes, for example rectangular (as shown), trapezoidal or may have the profile of a convex or concave lens.

Composite preparation stage 400 may include casting ion conducting material 406 between current collectors 402 and curing. Ion conducting material 406 may include a polyelectrolyte, for example: fluorinated ionomers, such as perfluorosulfonic acid (e.g. Nafion® perfluorosulfonic acid from E. I. du Pont de Nemours and Company); or non-fluorinated ionomers (e.g. hydrocarbon based ionomers), such as a copolymer of styrene and divinyl-benzene. Ion conducting material 406 may include an ionomer in the form of a dispersion (e.g. a solution or suspension) or a gel.

Ion conducting material 406 may be disposed using a variety of methods. Ion conducting material in the form of a dispersion may be disposed using a variety of methods, such as syringe dispensing, dipping, spraying, and slot die casting. In other embodiments, a gel of ion conducting material may be applied using a variety of methods, such as screen printing, knife coating and squeezing from a dispenser.

Curing may include heating current collectors 402 and ion conducting material 406 to or at a temperature that is above the glass transition or curing temperature of ion conducting material 406. Curing may, for example, induce cross-linking or may form ion conducting channels in ion conducting material 406 to form ion conducting components.

Alternatively, composite preparation stage 400 may include assembling current collectors 402 and ion conducting material 406 and bonding. For example, ion conducting material 406 may be in the form of strips of proton exchange membrane.

Modifications of method 400 or other methods may be practiced to prepare an asymmetric composite. For example, method 400 may be modified by adding additional stages, such as an optional activation stage. An optional activation stage may include activating current collectors 402 to improve the adhesion of ionomer to the surface of current collectors 402. In some embodiments, ion-conducting components may be formed by injection molding an ionomer pre-cursor resin between adjacent current collectors and then hydrolyzing the precursor to form ion conducting components.

In other embodiments, method 400 may be modified by practicing a continuous mode method of preparing an asymmetric composite. For example, current collectors may be in the form of a continuous roll, which may be aligned by applying tension on both sides of the roll. Ion conducting material may be cast into the spaces between current collectors on the roll. The roll may be passed through chambers and ovens to dry or cure the ion conducting material.

Asymmetric composites of some embodiments may be prepared by other example methods. For example, the asymmetric composite of FIG. 3B may be prepared by casting an ion conducting material into a substrate including electron conducting components and interface or substrate regions.

In one embodiment, composite 412 is subjected to catalyst application stage 450 to yield a coated composite 450. Catalyst application stage 450 may include applying a cathode layer to the upper surface of composite 412 and an anode layer to the lower surface of composite 412. Alternatively, catalyst application stage 450 may include applying an anode layer to the upper surface and a cathode layer to the lower surface of composite 412. Coated composite 444 may be subjected to bonding stage 452. In optional bonding stage 452, coated composite 450 is heated at a temperature and subjected to a pressure for a period of time. Bonded composite 446 may be subjected to an optional patterning stage 454 to yield a fuel cell layer 448 having asymmetric architecture. Patterning stage 454, if present, may be performed prior to, or after bonding stage 452. Alternately, the catalyst may be directly disposed on the composite layer in a selected pattern, thereby eliminating the need for patterning stage 454. In other embodiments, an additional layer, such as a support structure or cover layer may be added to the fuel cell layer following the catalyst application stage 450, and prior to, or after, the optional bonding stage 452. This additional layer may be bonded to the fuel cell layer directly, or may be attached by other means.

An asymmetric fuel cell layer, such as the embodiment shown in FIG. 2B, may be simpler to manufacture. Fuel cell layer 200 has anode coatings that are recessed from the surfaces of the current collectors.

Figure 7:
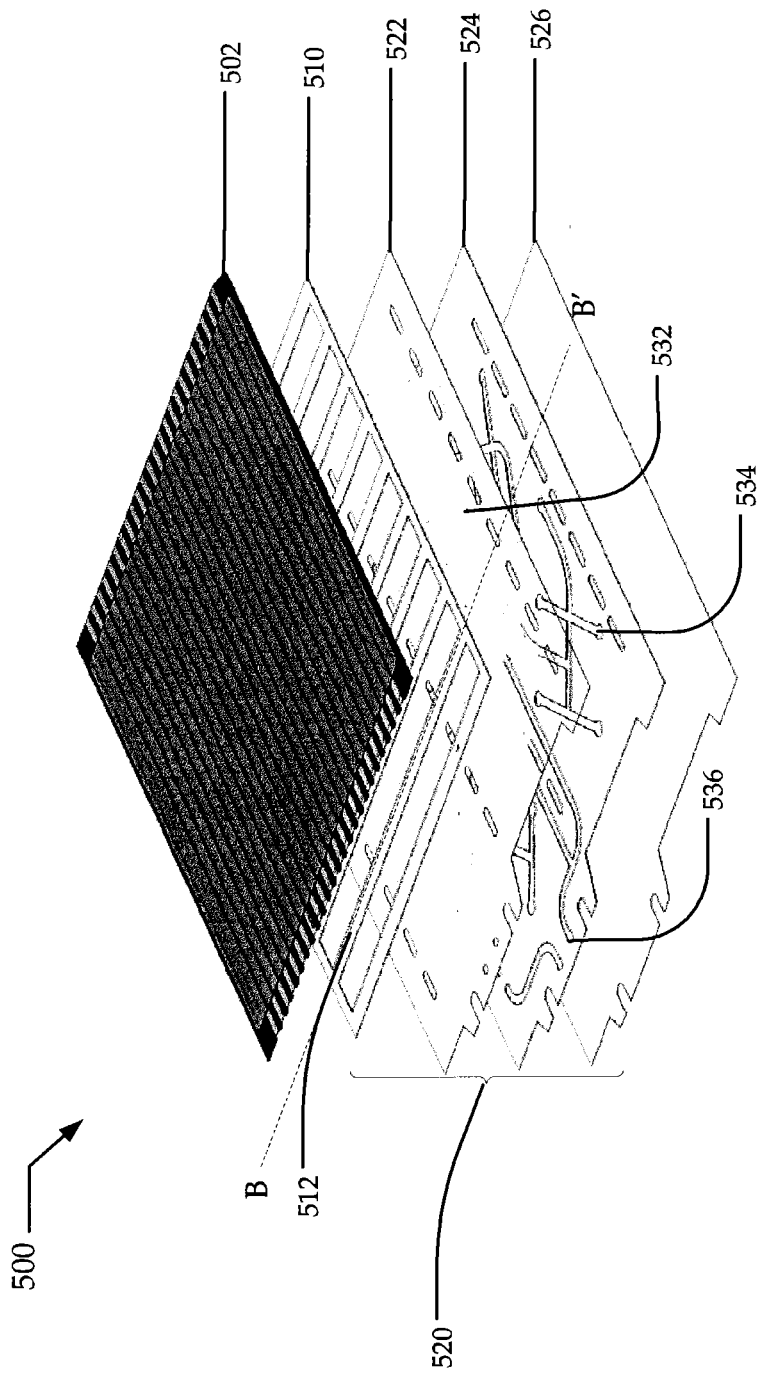
FIG. 7 is an expanded perspective view of a fuel cell system having an asymmetric fuel cell layer, according to an example embodiment.

FIG. 7 is an expanded perspective view of an example fuel cell system 500 including an asymmetric fuel cell layer, according to an example embodiment. Fuel cell system includes asymmetric fuel cell layer 502, and fluid manifold assembly 520. Fuel cell layer 502, fluid manifold assembly 520, or both, may be flexible, as described in co-assigned U.S. Patent Application Publication No. 2009/0081493, entitled "FUEL CELL SYSTEMS INCLUDING SPACE-SAVING FLUID PLENUM AND RELATED METHODS", which is herein incorporated by reference. However, it is to be understood that neither fuel cell layer 502 nor fluid manifold assembly 520 needs to be flexible.

In the example embodiment shown in FIG. 7, fluid manifold assembly 520 includes a manifold sealing layer 526, a manifold conduit layer 524 including channels 534, an inner manifold layer 522 including apertures 532, and a pedestal layer 510 including ribs 512. Fluid manifold assembly 520 may be coupled to a fluid reservoir (not shown) and optionally, a fluid pressure regulator (not shown). Fluid manifold assembly 520 and the fluid pressure regulator (if present) provide for the distribution, regulation and transfer of fuel from the fluid reservoir to fuel cell layer 502. In some examples, fuel may enter fluid manifold assembly 520 via fuel inlet 536 and travel through channels 534 and out apertures 532 towards the anode coatings of fuel cell layer 502. Fuel cell layer 502 may be coupled to pedestal layer 510, for example via bonding, or an adhesive.

Figure 8:
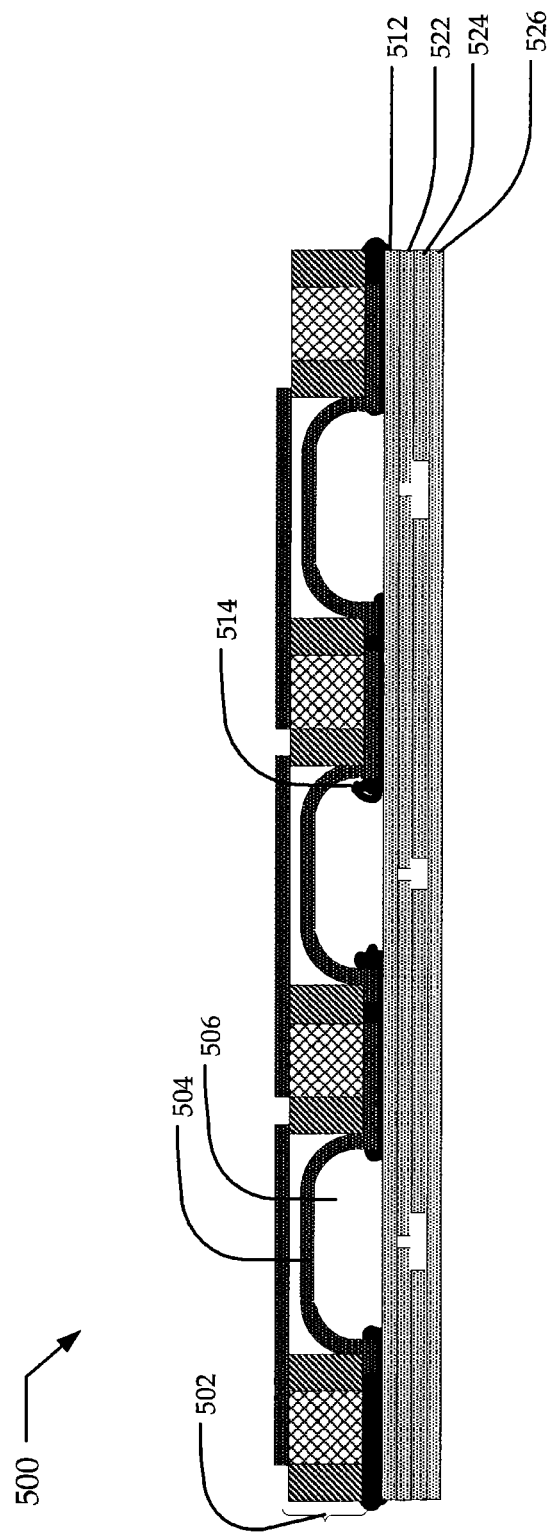
FIG. 8 is a cross-sectional view of the fuel cell system of FIG. 7.

FIG. 8 is a cross-sectional view of fuel cell system 500, taken at line B-B'. Fuel cell layer 502 is asymmetric, having trough-shaped anode coatings 504 defining voids 506. In the embodiment shown, fuel cell layer 502 is coupled to pedestal layer 510 via adhesive 514. As can be seen, excess adhesive 514 may flow into voids 506. With a symmetric fuel cell layer having anode coatings flush with the electron conducting components, excess adhesive may block the active area of the anode coatings. Accordingly, a fuel cell system having an asymmetric fuel cell layer may be simpler to assemble. An assembly method including asymmetric fuel cell layers may produce fewer defective fuel cell systems.

The voids may function as partial or full flow channels through which fuel or oxidant may flow. In the embodiment shown, voids 506 function as partial flow channels that allow for the flow of fuel from channels 534 to anode coatings 504. Accordingly, a fuel cell system having an asymmetric fuel cell layer may occupy less volume than a fuel cell system having a prior art planar fuel cell layer. The voids may optionally include a porous material (not shown) or a support structure as described above, which may be used to affect reactant distribution and/or provide additional structural support for the fuel cell layer.

In some embodiments, the surface of inner manifold layer 522 may be substantially flat as illustrated in FIG. 8, in other embodiments they could be patterned so as to provide flow channels or other means of reactant distribution. In some embodiments, fuel cell layer 502 may be arranged with a mirror image configuration relative to the fluid manifold, with the trough-shaped portions of the ion conducting components forming cathode coatings. In such an embodiment, a porous layer may be disposed between the fluid manifold and the fuel cell layer to provide reactant distribution, or the manifold may be patterned to provide flow channels given an anode surface that is flush with respect to the electron conducting components.

Additional Embodiments

The present invention provides for the following exemplary embodiments, the numbering of which does not necessarily correlate with the numbering of the embodiments described in the Figures:

Embodiment 1 provides a composite for a fuel cell layer including: a plurality of electron conducting components; a plurality of ion conducting components, each having a first surface and a second surface and wherein each ion conducting component is positioned between two electron conducting components; wherein the electron conducting components and the ion conducting components form a layer; and wherein at least one of the ion conducting components or the electron conducting components is geometrically asymmetric in one or more dimensions.

Embodiment 2 provides the composite of embodiment 1, wherein: the composite has a thickness and at least two surfaces; each of the ion conducting components define an ion conducting passage from one surface to the other; and each of the electron conducting components define an electron conducting passage from one surface to the other.

Embodiment 3 provides the composite of any one of embodiments 1-2, wherein at least one of the ion conducting components is asymmetric.

Embodiment 4 provides the composite of any one of embodiments 1-3, wherein the first and second surfaces of at least one of the ion conducting components are asymmetric with respect to surface area, surface shape, position with respect to the center of the composite, or a combination of these.

Embodiment 5 provides the composite of any one of embodiments 1-4, including: current collectors, each current collector including one of the electron conducting components; and wherein the ion conducting components are formed by casting an ion conducting material into spaces between current collectors.

Embodiment 6 provides the composite of embodiment 5, wherein the current collectors include interface regions.

Embodiment 7 provides the composite of any one of embodiments 1-6, wherein the first and second surfaces of at least one of the ion conducting components have different surface areas.

Embodiment 8 provides the composite of any one of embodiments 1-7, wherein the first and second surfaces of at least one of the ion conducting components have different positions with respect to the centre of the composite.

Embodiment 9 provides the composite of embodiment 8, wherein one of the first and second surfaces is recessed with respect to the corresponding surface of the adjacent electron conducting component.

Embodiment 10 provides the composite of any one of embodiments 8-9, wherein one of the first and second surfaces is raised with respect to the corresponding surface of the adjacent electron conducting component.

Embodiment 11 provides the composite of any one of embodiments 1-10, wherein the first and second surfaces of at least one of the ion conducting components have different shapes.

Embodiment 12 provides the composite of any one of embodiments 1-11, wherein the first and second surfaces of at least one of the ion conducting components have different positions with respect to the centre of the composite.

Embodiment 13 provides the composite of any one of embodiments 1-12, wherein one of the first and second surfaces is convex.

Embodiment 14 provides the composite of any one of embodiments 1-13, wherein one of the first and second surfaces is concave.

Embodiment 15 provides the composite of any one of embodiments 1-14, wherein one of the first and second surfaces is trough-shaped.

Embodiment 16 provides the composite of any one of embodiments 1-15, including: current collectors, each current collector including one of the electron conducting components; and wherein the ion conducting components are formed by casting an ion conducting material into spaces between current collectors.

Embodiment 17 provides the composite of any one of embodiments 1-16, wherein the current collectors include interface regions.

Embodiment 18 provides the composite of any one of embodiments 1-17, including: current collectors, each current collector including one of the electron conducting components; and wherein at least one of the current collectors is asymmetric.

Embodiment 19 provides the composite of embodiment 18, wherein the asymmetric current collector includes an electron conducting component that is asymmetric.

Embodiment 20 provides the composite of any one of embodiments 18-19, wherein two opposing surfaces of the asymmetric electron conducting component have different surface areas.

Embodiment 21 provides the composite of any one of embodiments 1-20, including: current collectors, each current collector including one of the electron conducting components; and wherein at least one of the current collectors is asymmetric.

Embodiment 22 provides the composite of embodiment 21, wherein the asymmetric current collector includes an electron conducting component that is asymmetric.

Embodiment 23 provides the composite of any one of embodiments 21-22, wherein two opposing surfaces of the asymmetric electron conducting component have different surface areas.

Embodiment 24 provides a fuel cell, including: a composite layer including a geometrically asymmetric ion conducting component having a first surface and a second surface and two or more electron conducting components having a first surface and a second surface, wherein the ion conducting component is positioned between the electron conducting components; and two electrode coatings that are each in ionic contact with the ion conducting component and in electrical contact with one of the electron conducting components.

Embodiment 25 provides the fuel cell of embodiment 24, wherein the two electrode coatings include a cathode coating disposed on the first surface of the ion conducting component and an anode coating disposed on the second surface of the ion conducting component.

Embodiment 26 provides the fuel cell of any one of embodiments 24-25, wherein the anode coating and the cathode coating are asymmetric with respect to surface area, surface shape, position with respect to the center of the composite, or a combination of these.

Embodiment 27 provides the fuel cell of any one of embodiments 24-26, wherein the anode coating and the cathode coating have different surface areas.

Embodiment 28 provides the fuel cell of any one of embodiments 24-27, including: two current collectors, each current collector including one of the electron conducting components; and wherein the ion conducting component is formed by casting an ion conducting material into spaces between the current collectors.

Embodiment 29 provides the fuel cell of any one of embodiments 24-28, wherein the current collectors include interface regions.

Embodiment 30 provides the fuel cell of any one of embodiments 24-29, wherein the anode coating and the cathode coating have different shapes.

Embodiment 31 provides the fuel cell of any one of embodiments 24-30, wherein the anode coating or the cathode coating is convex.

Embodiment 32 provides the fuel cell of any one of embodiments 24-31, wherein the anode coating or the cathode coating is concave.

Embodiment 33 provides the fuel cell of any one of embodiments 24-32, wherein the anode coating is concave and defines a void into which a fluid may be introduced.

Embodiment 34 provides the fuel cell of any one of embodiments 24-33, wherein the anode coating or the cathode coating is trough-shaped.

Embodiment 35 provides the fuel cell of any one of embodiments 24-34, wherein the anode coating is trough-shaped and defines a void into which a fluid may be introduced Embodiment 36 provides the fuel cell of any one of embodiments 24-35, including: two current collectors, each current collector including one of the electron conducting components; and wherein the ion conducting component is formed by casting an ion conducting material into spaces between the current collectors.

Embodiment 37 provides the fuel cell of embodiment 36, wherein the current collectors include interface regions.

Embodiment 38 provides the fuel cell of any one of embodiments 24-37, wherein the first surface and the second surface of the electron conducting components have different surface areas.

Embodiment 39 provides the fuel cell of any one of embodiments 24-38, including: two current collectors, each current collector including one of the electron conducting components; and wherein at least one of the current collectors is asymmetric.

Embodiment 40 provides the fuel cell of embodiment 39, wherein the asymmetric current collector includes an electron conducting component that is asymmetric.

Embodiment 41 provides the fuel cell of any one of embodiments 39-40, wherein the first surface and the second surface of the asymmetric electron conducting component have different surface areas.

Embodiment 42 provides the fuel cell of any one of embodiments 39-41, wherein the current collectors include interface regions and wherein the asymmetric current collector includes an interface region that is asymmetric.

Embodiment 43 provides a fuel cell layer, including: two or more fuel cells of any of claims 24-42, adjacently arranged so as to form a substantially planar layer.

The above description is intended to be illustrative, and not restrictive. Other embodiments may be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:
1. A fuel cell layer comprising:
 a plurality of current collectors each having a first surface and a parallel second surface, wherein the first surfaces of the current collectors are coplanar and wherein the second surfaces of the current collectors are coplanar, wherein each current collector comprises an electron conducting component and an interface region;
 a plurality of ion conducting components, each having a first surface and a second surface and wherein each ion conducting component is positioned between two of the current collectors;

a plurality of anode electrode coatings each contacting the first surface of one of the ion conducting components and the first surface of one of the two current collectors; and a plurality of cathode electrode coatings each contacting the second surface of one of the ion conducting components and the second surface of the other one of the two current collectors;

wherein the current collectors and the ion conducting components form a layer, the ion conducting components are geometrically asymmetric in one or more dimensions, and wherein at least one of the first and second surfaces of the ion conducting components is coplanar with the first surfaces or second surfaces of the current collectors.

2. The fuel cell layer of claim 1, wherein:

the layer formed by the current collectors and the ion conducting components has a thickness and at least two surfaces;

each of the ion conducting components define an ion conducting passage from one surface of the layer formed by the current collectors and the ion conducting components to the other; and each of the electron conducting components define an electron conducting passage from one surface of the layer formed by the current collectors and the ion conducting components to the other.

3. The fuel cell layer of claim 1, wherein at least one of the ion conducting components is asymmetric.

4. The fuel cell layer of claim 1, wherein the first and second surfaces of at least one of the ion conducting components are asymmetric with respect to surface area, surface shape, position with respect to the center of the layer formed by the current collectors and the ion conducting components, or a combination thereof.

5. The fuel cell layer of claim 1, wherein the ion conducting components are formed by casting an ion conducting material into spaces between current collectors.

6. The fuel cell layer of claim 1, wherein the first and second surfaces of at least one of the ion conducting components have different surface areas.

7. The fuel cell layer of claim 1, wherein the first and second surfaces of at least one of the ion conducting components have different positions with respect to the center of the layer formed by the current collectors and the ion conducting components.

8. The fuel cell layer of claim 7, wherein one of the first and second surfaces of the at least one ion conducting component is recessed with respect to the corresponding surface of the adjacent electron conducting component.

9. The fuel cell layer of claim 7, wherein one of the first and second surfaces of the at least one ion conducting component is raised with respect to the corresponding surface of the adjacent electron conducting component.

10. The fuel cell layer of claim 1, wherein the first and second surfaces of at least one of the ion conducting components have different shapes.

11. The fuel cell layer of claim 1, wherein one of the first and second surfaces of at least one of the ion conducting components is convex.

12. The fuel cell layer of claim 1, wherein one of the first and second surfaces of at least one of the ion conducting components is concave.

13. The fuel cell layer of claim 1, wherein one of the first and second surfaces of at least one of the ion conducting components is trough-shaped.

14. The fuel cell layer of claim 1, wherein at least one of the current collectors is asymmetric.

15. The fuel cell layer of claim 14, wherein the at least one asymmetric current collector comprises an electron conducting component that is asymmetric.

16. The fuel cell layer of claim 14, wherein two opposing surfaces of the at least one asymmetric electron conducting component have different surface areas.

17. A fuel cell, comprising:

two current collectors, each having a first surface and a parallel second surface, wherein the first surfaces of the current collectors are coplanar and wherein the second surfaces of the current collectors are coplanar, wherein each current collector comprises an electron conducting component and an interface region;

an ion conducting component, having a first surface and a second surface and wherein the ion conducting component is positioned between two of the current collectors;

an anode electrode coating contacting the first surface of the ion conducting component and the first surface of the current collector; and a cathode electrode coating contacting the second surface of the ion conducting component and the second surface of the other one of the two current collectors;

wherein the two current collectors and the ion conducting component form a layer, the ion conducting component is geometrically asymmetric in one or more dimensions, and wherein at least one of the first and second surfaces of the ion conducting component is coplanar with the first surfaces or second surfaces of the current collectors.

18. The fuel cell of claim 17, wherein the anode coating and the cathode coating are asymmetric with respect to surface area, surface shape, position with respect to the center of the layer formed by the two current collectors and the ion conducting component, or a combination thereof.

19. The fuel cell of claim 17, wherein the anode coating and the cathode coating have different surface areas.

20. The fuel cell of claim 17, wherein the ion conducting component is formed by casting an ion conducting material into spaces between the current collectors.

21. The fuel cell of claim 17, wherein the anode coating and the cathode coating have different shapes.

22. The fuel cell of claim 17, wherein the anode coating or the cathode coating is convex.

23. The fuel cell of claim 17, wherein the anode coating or the cathode coating is concave.

24. The fuel cell of claim 17, wherein the anode coating is concave and defines a void into which a fluid may be introduced.

25. The fuel cell of claim 17, wherein the anode coating or the cathode coating is trough-shaped.

26. The fuel cell of claim 17, wherein the anode coating is trough-shaped and defines a void into which a fluid may be introduced.

27. The fuel cell of claim 17, wherein the first surface and the second surface of the electron conducting components have different surface areas.

28. The fuel cell of claim 17, wherein at least one of the current collectors is asymmetric.

29. The fuel cell of claim 28, wherein the at least one asymmetric current collector comprises an electron conducting component that is asymmetric.

30. The fuel cell of claim 28, wherein the first surface and the second surface of the at least one asymmetric electron conducting component have different surface areas.

31. The fuel cell of claim 28, wherein the at least one asymmetric current collector comprises an interface region that is asymmetric.

32. A fuel cell layer, comprising:
two or more fuel cells of claim 17, adjacently arranged so as to form a substantially planar layer.

33. The fuel cell of claim 17, further comprising a support structure.

34. A fuel cell system, comprising:
a fuel cell comprising:
two current collectors each having a first surface and a parallel second surface, wherein the first surfaces of the current collectors are coplanar and wherein the second surfaces of the current collectors are coplanar, wherein each current collector comprises an electron conducting component and an interface region
an ion conducting component, having a first surface and a second surface and wherein the ion conducting component is positioned between two of the current collectors;
an anode electrode coating contacting the first surface of the ion conducting component and the first surface of the current collector; and
a cathode electrode coating contacting the second surface of the ion conducting component and the second surface of the other one of the two current collectors;
wherein the current collectors and the ion conducting component form a layer, the ion conducting component is geometrically asymmetric in one or more dimensions, and wherein at least one of the first and second surfaces of the ion conducting component is coplanar with the first surfaces or second surfaces of the current collectors; and
a support structure bonded to:
at least one of the two electrode coatings,
one or more of the electron conducting components,
a fluidic or fuel distribution manifold, or
a combination thereof.

35. The fuel cell system of claim 34, wherein the support structure is disposed proximate to the layer formed by the current collectors and the ion conducting component and a fluidic or fuel distribution manifold.

36. The fuel cell system of claim 34, wherein the support structure is a dimensionally stable porous material, a mesh, a woven or non-woven fabric, expanded sheets, or discrete threads composed of inert materials.

37. The fuel cell system of claim 34, wherein the support structure acts as a tension member.

38. The fuel cell system of claim 34, wherein the support structure is applied with a pre-stress tension.

39. The fuel cell system of claim 34, wherein the support structure is conductive.

40. The fuel cell system of claim 34, wherein the support structure is non-conductive.

41. The fuel cell system of claim 34, wherein the support structure is symmetric.

42. The fuel cell system of claim 34, wherein the support structure is asymmetric.

43. A method of making a fuel cell layer having an asymmetric architecture, the method comprising:
forming a composite, comprising
casting ion conducting material between current collectors, each comprising an electron conducting component and an interface region, wherein the first surfaces of the current collectors are coplanar and wherein the second surfaces of the current collectors are coplanar and curing the ion conducting material, to give a composite comprising
a plurality of the electron conducting components and an interface region; and
a plurality of ion conducting components comprising the cured ion conducting material, each having a first surface and a second surface and wherein each ion conducting component is positioned between two of the current collectors, wherein the electron conducting components and the ion conducting components form a layer, wherein at least one of the first and second surfaces of the ion conducting components is coplanar with the first surfaces or second surfaces of the current collectors and at least one of the ion conducting components or the electron conducting components is geometrically asymmetric in one or more dimensions; and
applying anode electrode coatings each contacting the first surface of one of the ion conducting components and the first surface of one of the two current collectors, and applying cathode electrode coatings each contacting the second surface of one of the ion conducting components and the second surface of the other one of the two current collectors, to give a fuel cell layer having an asymmetric architecture.

44. The method of claim 43, further comprising:
bonding a support structure to:
at least one of the two electrode coatings,
one or more of the electron conducting components,
a fluidic or fuel distribution manifold, or
a combination thereof.

45. A fuel cell system comprising the fuel cell layer having an asymmetric architecture of claim 43.

* * * * *